United States Patent
Kim et al.

(10) Patent No.: US 12,404,370 B2
(45) Date of Patent: Sep. 2, 2025

(54) METHOD FOR PRODUCING POLYIMIDE FILM AND POLYIMIDE FILM MANUFACTURED THEREBY

(71) Applicant: PI Advanced Materials Co., Ltd., Chungcheongbuk-do (KR)

(72) Inventors: Dong Young Kim, Chungcheongbuk-do (KR); Dong Young Won, Chungcheongbuk-do (KR); Jeong Yeul Choi, Chungcheongbuk-do (KR)

(73) Assignee: PI Advanced Materials Co., Ltd., Chungcheongbuk-do (KR)

( * ) Notice: Subject to any disclaimer, the term of this patent is extended or adjusted under 35 U.S.C. 154(b) by 867 days.

(21) Appl. No.: 17/609,565

(22) PCT Filed: Oct. 29, 2019

(86) PCT No.: PCT/KR2019/014398
§ 371 (c)(1),
(2) Date: Nov. 8, 2021

(87) PCT Pub. No.: WO2020/226243
PCT Pub. Date: Nov. 12, 2020

(65) Prior Publication Data
US 2022/0411585 A1  Dec. 29, 2022

(30) Foreign Application Priority Data
May 8, 2019  (KR) .................. 10-2019-0053583

(51) Int. Cl.
*C08G 73/10* (2006.01)
*C08J 5/18* (2006.01)
*C08K 5/09* (2006.01)

(52) U.S. Cl.
CPC ..... *C08G 73/1067* (2013.01); *C08G 73/1021* (2013.01); *C08J 5/18* (2013.01); *C08K 5/09* (2013.01); *C08J 2379/08* (2013.01)

(58) Field of Classification Search
CPC .... C08G 73/1067; C08G 73/1021; C08J 5/18; C08J 2379/08; C08K 5/09; H10K 85/657;
(Continued)

(56) References Cited

U.S. PATENT DOCUMENTS

2009/0078453 A1  3/2009  Jung
2014/0349098 A1  11/2014  Hong et al.
(Continued)

FOREIGN PATENT DOCUMENTS

| CN | 107108887 A | 8/2017 |
| CN | 108137835 A | 6/2018 |

(Continued)

OTHER PUBLICATIONS

International Search Report and Written Opinion from related PCT Application No. PCT/KR2019/014398, dated Feb. 7, 2020, 9 pages.

*Primary Examiner* — Shane Fang
(74) *Attorney, Agent, or Firm* — Brooks, Cameron & Huebsch, PLLC

(57) ABSTRACT

The present invention relates to a method for manufacturing a polyimide film and a polyimide film manufactured thereby. In one embodiment, the method for preparing a polyimide film includes: preparing a polyamic acid by polymerizing a mixture containing an aromatic diamine and an aromatic acid dianhydride: preparing a first composition containing the polyamic acid, an amine-based catalyst, an acid anhydride-based dehydrating agent, and a solvent; and forming a polyimide film at 150° C. or less using the first composition, wherein the first composition contains the amine-based catalyst and the acid anhydride-based dehydrating agent in a molar ratio of 1:2 to 1:5.

11 Claims, 2 Drawing Sheets

(58) Field of Classification Search
CPC .......... H10K 85/6574; H10K 85/6572; H10K 2101/10; H10K 50/16; H10K 50/18; H10K 50/11; H10K 50/171; C07D 471/04; C07D 471/14; C07D 519/00; C09K 11/06; C09K 2211/1018
See application file for complete search history.

(56) References Cited

U.S. PATENT DOCUMENTS

| | | |
|---|---|---|
| 2018/0312638 A1 | 11/2018 | Cho et al. |
| 2019/0112425 A1 | 4/2019 | Chung |

FOREIGN PATENT DOCUMENTS

| | | | | |
|---|---|---|---|---|
| JP | 2006327022 A | | 12/2006 | |
| JP | 2010077311 | * | 4/2010 | ............ C08G 73/10 |
| JP | 2010163595 A | | 7/2010 | |
| JP | 2014136721 A | | 7/2014 | |
| JP | 2017179148 A | | 10/2017 | |
| KR | 20140049382 A | | 4/2014 | |
| KR | 10-20160081041 A | | 7/2016 | |
| KR | 20160081041 A | | 7/2016 | |
| KR | 20170049912 A | | 5/2017 | |
| KR | 20180000863 A | | 1/2018 | |
| KR | 101966737 B | | 7/2018 | |
| WO | 2011/013904 A2 | | 2/2011 | |
| WO | 2012/081763 A1 | | 6/2021 | |

* cited by examiner (a) Example     (b) Comparative Example 1

(c) Comparative Example 2     (d) Comparative Example 3

METHOD FOR PRODUCING POLYIMIDE FILM AND POLYIMIDE FILM MANUFACTURED THEREBY

TECHNICAL FIELD

The present disclosure relates to a method for manufacturing a polyimide film and a polyimide film manufactured thereby. More particularly, the present disclosure relates to a method for manufacturing a polyimide film suitable for use in a foldable phone, etc., due to excellent optical properties and flexibility, and a polyimide film manufactured thereby.

BACKGROUND ART

Polyimide (PI) is a material with excellent heat resistance and mechanical properties, and has been widely used as a core material for automobiles, aerospace fields, and flexible circuit boards, etc.

Meanwhile, a polyimide film is manufactured by performing solution polymerization on an aromatic diamine and an aromatic acid dianhydride, mixing the mixture with a catalyst, applying the mixture in a film form, drying it at a high temperature, and performing a ring closure reaction through dehydration. Recently, with the development of colorless and transparent polyimide, they are also used as insulating and protective films for displays that require optical properties, bending resistance, abrasion resistance, dimensional stability, etc.

Prior art related to the present disclosure is disclosed on Korean Patent Publication No. 10-1966737 (published on Apr. 9, 2019, entitled "Polyimide Precursor Composition and Polyimide Film using the same").

DISCLOSURE

Technical Problem

An object of the present disclosure is to provide a method for manufacturing a polyimide film having excellent transparency and optical properties.

Another object of the present disclosure is to provide a method for manufacturing a polyimide film having excellent heat resistance, chemical resistance, and flexibility.

Still another object of the present disclosure is to provide a method for manufacturing a polyimide film that enables rapid film formation and has excellent productivity and economical efficiency.

Yet another object of the present disclosure is to provide a method for manufacturing a polyimide film that does not cause breakage and is excellent in a surface defect prevention effect when the film is manufactured.

Yet another object of the present disclosure is to provide a polyimide film manufactured by the method for manufacturing a polyimide

Technical Solution

One aspect of the present disclosure relates to a method for manufacturing a polyimide film. In one embodiment, the method for preparing a polyimide film includes: preparing a polyamic acid by polymerizing a mixture containing an aromatic diamine and an aromatic acid dianhydride; preparing a first composition containing the polyamic acid, an amine-based catalyst, an acid anhydride-based dehydrating agent, and a solvent; and forming a polyimide film at 150° C. or less using the first composition, wherein the first composition contains the amine-based catalyst and the acid anhydride-based dehydrating agent in a molar ratio of 1:2 to 1:5.

In one embodiment, the mixture may contain 100 parts by weight of an aromatic diamine and 70 to 350 parts by weight of an aromatic acid dianhydride.

In one embodiment, the aromatic diamine may include diaminophenyl ether, p-phenylenediamine, o-phenylenediamine, m-phenylenediamine, 2,6-diaminopyridine, 4,4-diaminodiphenylsulfone, 4,4'-methylenediamine, 3,4'-oxydianiline, 4,4'-oxydianiline, 2-(4-aminophenyl)-1H-benzoxazole-5-amine, 1,4-bis(4-aminophenoxy)benzene, 2-(4-aminophenyl)-5-aminobenzimidazole, 6-amino-2-(p-aminophenyl)benzoxazole, and 4,4'-diamino-p-terphenyl.

In one embodiment, the aromatic acid dianhydride may include one or more selected from the group consisting of pyromellitic dianhydride, 3,3',4,4'-benzophenonetetracarboxylic dianhydride, 3,4,3',4'-biphenyltetracarboxylic dianhydride, 3,4,3',4'-diphenylsulfonetetracarboxylic dianhydride, 1H-3H-naphtho[2,3-c:6,7-c']difuran-1,3,6,8-tetrone 2,3,6,7-naphthalenetetracarboxylic dianhydride, 1,4,5,8-naphthalenetetracarboxylic dianhydride, 4,4'-oxybis(2-benzofuran-1,3-dione), 4-[(1,3-dioxo-1,3-dihydro-2-benzofuran-5-yl)oxy]-2-benzofuran-1,3-dione, and 5,5'-sulfonylbis-1,3-isobenzofurandione.

In one embodiment, the method may further include, after the forming of the polyimide film, curing the formed polyimide film.

In one embodiment, the polyamic acid may have a viscosity of 10,000 to 200,000 cP as measured at 23° C.

In one embodiment, the first composition may contain 100 parts by weight of polyamic acid, 5 to 25 parts by weight of an amine-based catalyst, 8 to 50 parts by weight of an acid anhydride-based dehydrating agent, and 30 to 200 parts by weight of a solvent.

In one embodiment, the first composition may have a viscosity of 50,000 to 500,000 cP, as measured at 23° C.

In an embodiment, the acid anhydride-based dehydrating agent may include acetic anhydride.

In one embodiment, the solvent may include one or more selected from the group consisting of dimethylformamide, dimethylacetamide, N-methyl-2-pyrrolidone, m-cresol, tetrahydrofuran, and chloroform.

In one embodiment, the amine-based catalyst may include one or more selected from the group consisting of betapicoline, isoquinoline, tri ethylenediamine, and pyridine.

In one embodiment, the first composition further contains an additive, and the additive may include one or more selected form the group consisting of an antioxidant, a light stabilizer, an antistatic agent, a heat stabilizer, a flame retardant, and an inorganic filler.

In one embodiment, the drying may be performed at 130° C. to 150° C.

Another aspect of the present disclosure relates to a polyimide film manufactured by the method for manufacturing a polyimide film.

In one embodiment, the polyimide film may have a glass transition temperature (Tg) of 350° C. or more, and transmittance of 30% or more, as measured according to ASTM D 1003 standard.

In one embodiment, the polyimide film may have a density of 1.2 to 1.8 g/cm$^3$, and a thermal expansion coefficient of 10 μm/(m·° C.) or less, as measured according to ASTM E 831 standard.

In one embodiment, the polyimide film may have a tensile strength of 300 MPa or more, a tensile modulus of 6 GPa or more, and an elongation of 30% or more, as measured according to ASTM D 882 standard.

Advantageous Effects

When a polyimide film is manufactured using a method for manufacturing a polyimide film of the present disclosure, excellent transparency and optical properties are excellent, excellent heat resistance, chemical resistance and flexibility are excellent, the film may be formed rapidly, productivity and economical efficiency are excellent, and a breakage and surface defect prevention effect is excellent when the film is manufactured, and the manufactured polyimide film may be suitable for being used for a foldable phone, etc.

BEST MODE

In the following description, the detailed description of related known technology or configuration will be omitted when it may obscure the subject matter of the present disclosure.

Further, the terms of constituent elements, which will be described hereinafter, are defined in consideration of their functions in the present disclosure and may be changed according to the intention of a user or an operator, or according to the custom. Accordingly, definitions of these terms must be based on the overall description herein.

In addition, as used herein, the terms "upper portion" and "lower portion" are defined based on the drawings, and the "upper portion" may be changed to the "lower portion" and the "lower portion" to the "upper portion" depending on the viewing poi of view.

Method for Manufacturing Polyimide Film

Figure 1:
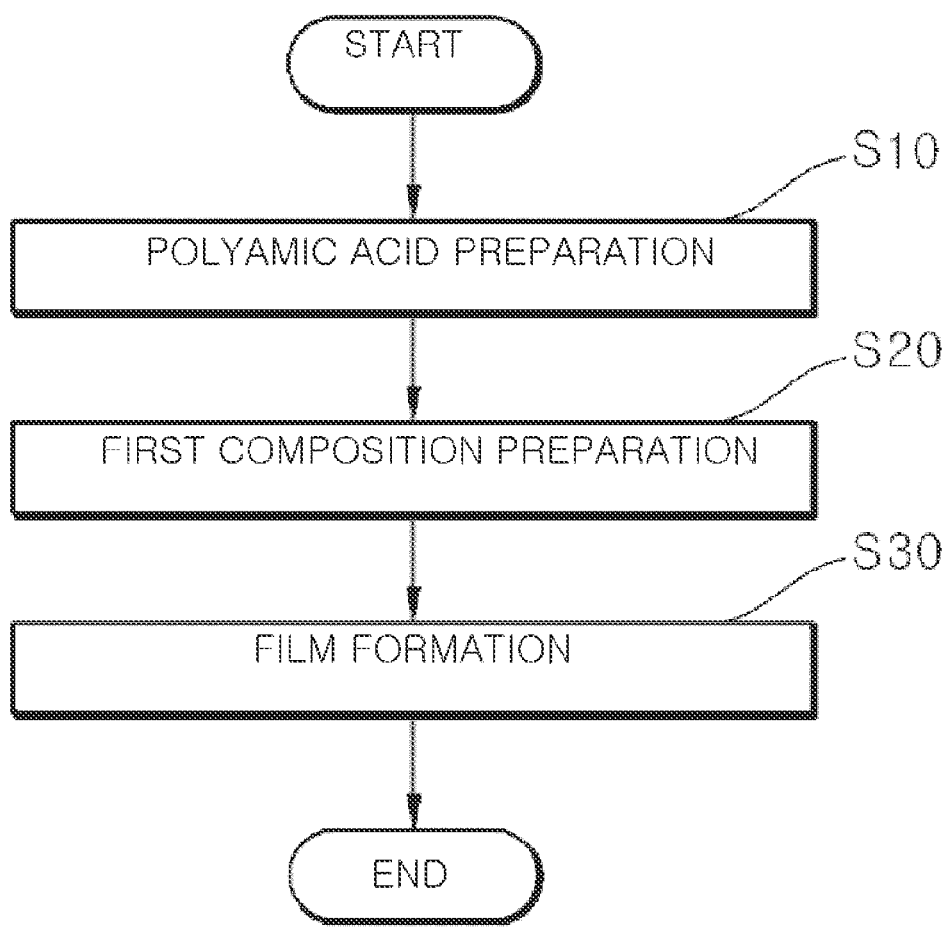
FIG. 1 illustrates a method for manufacturing a polyimide film according to an embodiment of the present disclosure.

One aspect of the present disclosure relates to a method for manufacturing a polyimide film. FIG. 1 illustrates a method for manufacturing a polyimide film according to an embodiment of the present disclosure.

Referring to FIG. 1, the method for manufacturing a polyimide film includes (S10) a polyamic acid preparation step; (S20) a first composition preparation step; and (S30) a film formation step. More specifically, the method for preparing a polyimide film includes (S10) preparing a polyamic acid by polymerizing a mixture containing an aromatic diamine and an aromatic acid dianhydride; (S20) preparing a first composition containing the polyamic acid, an amine-based catalyst, an acid anhydride-based dehydrating agent, and a solvent; and (S30) forming a polyimide film at 150° C. or less using the first composition, wherein the first composition contains the amine-based catalyst and the acid anhydride-based dehydrating agent in a molar ratio of 1:2 to 1:5.

Hereinafter, each step of the method for manufacturing a polyimide film according to the present disclosure will be described in detail.

(S10) Polyamic Acid Preparation Step

The step is a step of preparing a polyamic acid by polymerizing a mixture containing an aromatic diamine and an aromatic acid dianhydride.

In one embodiment, the mixture may contain 100 parts by weight of an aromatic diamine, 70 to 350 parts by weight of an aromatic acid dianhydride, and 500 to 2500 parts by weight of a polymerization solvent.

In one embodiment, the aromatic diamine may include one or more selected form the group consisting of diaminophenyl ether, p-phenylenediamine, o-phenylenediamine, m-phenylenediamine, 2,6-diaminopyridine, 4,4-diaminodiphenylsulfone, 4,4'-methylenediamine, 2-(4-aminophenyl)-1H-benzoxazole-5-amine, 1,4-bis(4-aminophenoxy)benzene, 2-(4-aminophenyl)-5-aminobenzimidazole, 6-amino-2-(p-aminophenyl)benzoxazole, and 4,4'-diamino-p-terphenyl.

In one embodiment, the aromatic acid dianhydride may include one or more selected from the group consisting of pyromellitic dianhydride (PMDA, 3,3',4,4'-benzophenonetetracarboxylic dianhydride (BTDA), 3,4,3',4'-biphenyltetracarboxylic dianhydride (BPDA), 3,4,3',4'-diphenylsulfonetetracarboxylic dianhydride, 1H-3H-naphtho[2,3-c:6,7-c']difuran-1,3,6,8-tetrone 2,3,6,7-naphthalenetetracarboxylic dianhydride, 1,4,5,8-naphthalenetetracarboxylic dianhydride, 4,4'-oxybis(2-benzofuran-1,3-dione), 4-[(1,3-dioxo-1,3-dihydro-2-benzofuran-5-y)oxy]-2-benzofuran-1,3-dione, and 5,5'-sulfonylbis-1,3-isobenzofurandione.

For example, the aromatic diamine may include 4,4'-oxydianiline and p-phenylenediamine. When the aromatic diamine is included, it is easy to adjust the viscosity of the polyamic acid, and the manufactured polyimide film has excellent mechanical properties, and thus may be suitable for use in a foldable phone.

In one embodiment, the aromatic diamine may include the 4,4'-oxydianiline and the p-phenylenediamine in a weight ratio of 1:1 to 1:4. When the 4,4'-oxydianiline and the p-phenylenediamine are included within the above weight ratio range, it is easy to adjust the viscosity of the polyamic acid, and the manufactured polyimide film may have excellent mechanical properties. Fax example, the 4,4'-oxydianiline and the p-phenylenediamine may be included in a weight ratio of 1:2 to 1:4. For example, the 4,4'-oxydianiline and the p-phenylenediamine may be included in a weight ratio of 1:2.5 to 1:3.5.

In one embodiment, the aromatic acid dianhydride may be included in an amount of 70 to 350 parts by weight based on 100 parts by weight of the aromatic diamine. When the aromatic acid dianhydride is included within the above range, it is easy to adjust the viscosity of the polyamic acid, so that the film may have excellent moldability, and when the polyimide film is formed, hydrolysis of the film by the unreacted aromatic acid dianhydride is prevented, so that the film may have excellent stability. For example, the aromatic acid dianhydride may be included in an amount of 130 to 320 parts by weight based on 100 parts by weight of the aromatic diamine.

In one embodiment, the polymerization reaction may be performed for 1 to 24 hours at a temperature of −10° C. to 60° C. in an inert atmosphere such as nitrogen. A polymerization solvent for the polymerization reaction of the mixture may include one capable of dissolving the mixture. In one embodiment, the polymerization solvent may include one or more selected from the group consisting of dimethylformamide, dimethylacetamide, N-methyl-2-pyrrolidone, m-cresol, tetrahydrofuran, and chloroform.

In one embodiment, the polymerization solvent may be included in an amount of 500 to 2,500 parts by weight based on 100 parts by weight of the aromatic diamine. When the polymerization solvent is included within the above range, it is easy to adjust the viscosity of the polyamic acid, and polymerization efficiency may be excellent. For example, the polymerization solvent may be included in 1,500 to 2,200 parts by weight based on 100 parts by weight of the aromatic diamine.

In one embodiment, the polyamic acid may have a viscosity of 10,000 to 200,000 cP, as measured at 23° C. Mixability and formability may be excellent within the above viscosity range. For example, the viscosity may be 110,000 to 130,000 cP.

The polyamic acid may have a weight average molecular weight of 150,000 to 1,000,000 g/mol. For example, the weight average molecular weight may be 260,000 to 700,000 g/mol or less. When the polyamic acid having a weight average molecular weight within the above range is applied, the polyimide film may have excellent heat resistance and mechanical properties.

(S20) First Composition Preparation Step

The step is a step of preparing a first composition containing the polyamic acid, an amine-based catalyst, an acid anhydride-based dehydrating agent, and a solvent.

In one embodiment, the first composition may contain 100 parts by weight of polyamic acid, 5 to 25 parts by weight of an amine-based catalyst, 8 to 50 parts by weight of an acid anhydride-based dehydrating agent, and 30 to 200 parts by weight of a solvent.

In one embodiment, the amine-based catalyst may include one or more selected from the group consisting of betapicoline, isoquinoline, triethylenediamine, and pyridine. When the catalyst is included, the imidization reaction rate and transparency may be excellent.

In one embodiment, the amine-based catalyst may be included in an amount of 5 to 25 parts by weight based on 100 parts by weight of the polyamic acid. When the amine-based catalyst is included within the above range, the imidization reaction rate is excellent during film formation, the manufactured polyimide film has excellent transmittance, and surface defects may be prevented.

The acid anhydride-based dehydrating agent may promote a ring closure reaction through dehydration on the polyamic acid. For example, the acid anhydride-based dehydrating agent may include acetic anhydride. When the dehydrating agent is included, film forming efficiency may be excellent.

In one embodiment, the acid anhydride-based dehydrating agent may be included in an amount of 8 to 50 parts by weight based on 100 moles of the polyamic acid. When the acid anhydride-based dehydrating agent is included within the above range, the imidization reaction rate may be excellent while preventing the deterioration of the mechanical strength or the occurrence of defects such as cracks of the polyimide film.

In one embodiment, the first composition may have a viscosity of 50,000 to 500,000 cP as measured at 23° C. When the viscosity is within the above range, the polyimide film may have excellent formability and mechanical strength. For example, the viscosity may be 80,000 to 300,000 cP. For another example, the viscosity may be 80,000-110,000 cP.

The first composition contains an amine-based catalyst and an acid anhydride-based dehydrating agent in a molar ratio of 1:2 to 1:5. When the molar ratio of the amine-based catalyst and the acid anhydride-based dehydrating agent is within the above range, an amidation reaction rate is improved, such that film-forming rate may be excellent, the polyimide film may have excellent appearance by preventing the occurrence of bubbles, and a brittle phenomenon of the polyimide film is prevented, such that mechanical properties may be excellent. When the acid anhydride-based dehydrating agent is included in a molar ratio of less than 1:2 with respect to the amine-based based catalyst, the polyimide film may have a deteriorated mechanical strength or detects such as cracks. When the acid anhydride-based dehydrating agent is included in a molar ratio of greater than 1:5 with respect to the amine-based catalyst, the reaction rate may be reduced, or the polyimide film may have a deteriorated mechanical strength or defects such as cracks. For example, the first composition may contain an amine-based catalyst and an acid anhydride-based dehydrating agent in a molar ratio of 1:2.5 to 1:4.5.

As another example, the first composition may contain an amine-based catalyst and an acid anhydride-based dehydrating agent in a weight ratio of 1:1.6 to 1:4. When the amine-based catalyst and the acid anhydride-based dehydrating agent are included within the above weight ratio range, the amidation reaction rate is improved, such that the film-forming rate may be excellent, and the polyimide film may have excellent mechanical properties.

In one embodiment, the solvent may include one or more selected from the group consisting of dimethylformamide, dimethylacetamide, N-methyl-2-pyrrolidone, m-cresol, tetrahydrofuran, and chloroform.

In one embodiment, the solvent may be included in an amount of 30 to 200 parts by weight based on 100 parts by weight of the polyamic acid. When the solvent is included within the above range, it is easy to adjust the viscosity of the polyamic acid, and polymerization efficiency may be excellent. For example, the polymerization solvent may be included in an amount of 100 to 1,000 parts by weight based on 100 parts by weight of the polyamic acid.

The first composition may include an amine-based catalyst, an acid anhydride-based dehydrating agent, and a solvent in a weight ratio of 1:2:2 to 1:5:6. When the amine-based catalyst, the acid anhydride-based dehydrating agent, and the solvent are included within the above weight ratio range, the film-forming rate may be excellent, and mechanical properties may be excellent while preventing surface defects such as cracks of the polyimide film.

In one embodiment, the first composition further contains an additive, and the additive may include one or more selected form the group consisting of an antioxidant, a light stabilizer, an antistatic agent, a heat stabilizer, a flame retardant, and an inorganic filler.

For example, an inorganic filler may be included as the additive. Examples of the inorganic filler include silica, titanium oxide, alumina, silicon nitride, boron nitride, calcium hydrogen phosphate, calcium phosphate, and mica. In one embodiment, the average particle diameter of the inorganic filler is not particularly limited, but may be 0.05 to 100 μm. In one embodiment, the additive may be included in an amount of 0.01 to 100 parts by weight based on 100 parts by weight of the polyamic acid.

(S30) Film Formation Step

The step is a step of forming a film by drying the first composition at 150° C. or less. Conventionally, the first composition was dried at a high temperature in excess of 150° C. and formed into a film. In this case, breakage of the film occurred. The film of the present disclosure uses a composition that does not cause breakage and is dried at 150° C. or less as a film forming temperature suitable for this, such that breakage does not occur. If the drying is performed at a temperature exceeding 150° C., the amine-based catalyst may be decomposed, resulting in breakage of the polyimide film or deterioration of mechanical properties. In one embodiment, the drying may be performed at 130 to 150° C. For another example, the drying may be performed at 135 to 145° C.

When the film is formed at a high temperature in which the temperature of the drying means (dryer) is more than 150° C. and less than or equal to 170° C., there are problems in that film formation is achieved only when the amine-based catalyst and acid anhydride-based dehydrating agent of the first composition are applied in an excess of 1:5 molar ratio, and also the film-forming rate is reduced to deteriorate productivity and economic efficiency, and the formed polyimide film has deteriorated light transmittance and a surface defect. For example, the first composition may be dried at 150° C. or lower for 150 to 240 seconds to form a film.

(S40) Curing Step

After the film formation step, the method may further include curing the formed polyimide film. In one embodiment, the curing may be performed at 200 to 650° C. When the curing is performed under the above conditions, the polyimide film may have excellent mechanical properties.

Polyimide Film Manufactured by Method for Manufacturing Polyimide Film

Another aspect of the present disclosure relates to a polyimide film manufactured by the method for manufacturing a polyimide film. In one embodiment, the polyimide film may have a glass transition temperature (Tg) of 350° C. or more, and a transmittance of 30% or more, as measured according to ASTM D 1003 standard. In the above range, the polyimide film may be suitable for use as a foldable phone. For example, the polyimide film may have a glass transition temperature is 350 to 600° C., and a transmittance of 30 to 50%.

In one embodiment, the polyimide film may have a density of 1.2 to 1.8 $g/cm^3$, and a thermal expansion coefficient of 10 $\mu m/(m \cdot °C.)$ or less, as measured according to ASTM E 831 standard. For example, the polyimide film may have a density of 1.3 to 1.7 $g/cm^3$ and a thermal expansion coefficient of 6 $\mu m/(m \cdot °C.)$ or less.

In one embodiment, the polyimide film may have a tensile strength of 300 MPa or more, a tensile modulus of 6 GPa or more, and an elongation of 30% or more, as measured according to ASTM D 882 standard. For example, the polyimide film may have a tensile strength of 300 to 800 MPa, a tensile modulus of 6 to 15 GPa, and an elongation of 50 to 100%.

Mode for Invention

Hereinafter, the configuration and operation of the present disclosure will be described in more detail with reference to preferred embodiments of the present disclosure. These examples are merely presented as preferred examples of the present disclosure, and cannot be construed as limiting the present disclosure in any way.

Contents not described herein can be sufficiently technically inferred by those skilled in the art, so the description thereof will be omitted.

EXAMPLES AND COMPARATIVE EXAMPLES

Example (a) Polyamic acid preparation: While injecting nitrogen into a 300 kg reactor equipped with a stirrer and nitrogen injection and discharge pipe, 250 kg of a polymerization solvent (DMF) was added and the temperature of the reactor was set to 30° C. Then, 3 to 7 kg of 4,4'-oxydianiline (4,4'-ODA), 9 to 12 kg of p-phenylenediamine (pPDA), 10.5 to 16.5 kg of aromatic acid dianhydride (PMDA), and 14 to 22 kg of 3,4,3',4'-biphenyltetracarboxylic dianhydride (BPDA) were added thereto and completely dissolved. After stirring was continued for 120 minutes while raising the temperature to 30° C. under a nitrogen atmosphere, a polyamic acid having a total solid content of 15% by weight and a viscosity at 23° C. as shown in Table 1 below, was prepared.

(b) First composition preparation: The First composition having 50 g of the prepared polyamic acid, 5 g of an amine-based catalyst (isoquinoline), 11.86 g of an acid anhydride-based dehydrating agent (acetic anhydride), and 19.25 g of a solvent (DMF), and a viscosity at 23° C. as shown in Table 1 below, was prepared (isoquinoline:acetic anhydride=a molar ratio of 1:3).

(c) Film formation: The first composition was applied on a support and then formed into a film at 110 to 140° C. for 3 minutes to manufacture a polyamide film having a thickness of 25 μm.

(d) Curing: The polyimide film was cured at 600° C. to manufacture a polyimide film having a density as shown in Table 1 below.

Comparative Example 1

A polyimide film was manufactured in the same manner as in the Example, except that the film formation was performed at 152° C. for 3 minutes.

Comparative Example 2

A polyimide film was manufactured in the same manner as in the Example, except that the film formation was carried out at 170° C. for 3 minutes.

Comparative Example 3

A polyimide film was manufactured in the same manner as in the Example, except that 50 g of polyamic acid, 5 g of amine-based catalyst (isoquinoline), 26 g of acid anhydride-based dehydrating agent (acetic anhydride), and 25 g of solvent (DMF) were contained as the first composition (isoquinoline:acetic anhydride=a molar ratio of 1:6.6).

Figure 2:
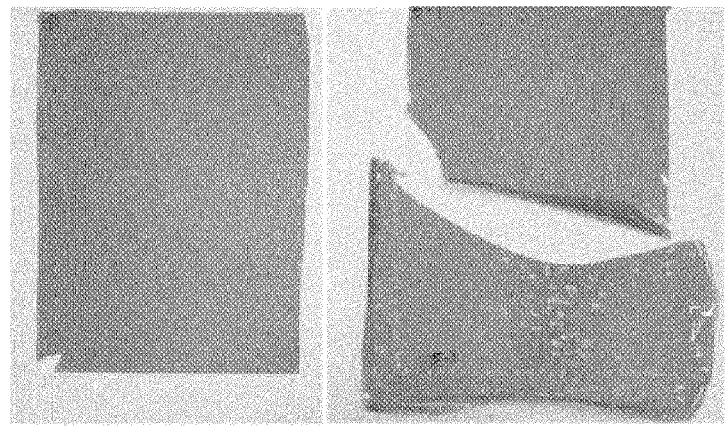
FIG. 2A illustrates a polyimide film of Example.
FIG. 2B illustrates a polyimide film of Comparative Example 1.
FIG. 2C illustrates a polyimide film of Comparative Example 2.
FIG. 2D is a photograph illustrating a polyimide film of Comparative Example 3.
Figure 2:
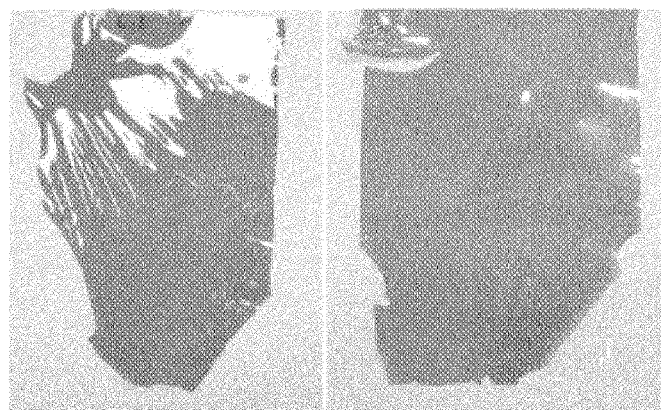

For representative Example and Comparative Example 3 among the Example and Comparative Examples, physical properties were evaluated in the following manner and the results are shown in Table 1 below. In addition, the polyimide films manufactured according to the Example and Comparative Examples 1 to 3 are shown in FIG. 2 below.

(1) Surface properties analysis of polyimide film: The surfaces of the polyimide films of the Example and the Comparative Examples were visually observed to confirm the number of surface defects per area of 10*10 cm, and the results were exhibited by classifying them by grade.

(Classification Criteria—Grade S: surface defects: 0; Grade A: surface defects: 5 or less; Grade B: surface defects: 10 or less; Grade C: surface defects: more than 10).

(2) Glass transition temperature: After the polyimide substrates of the Example and Comparative Examples were cut into widths of 9 mm and lengths of 20 mm by using TA's Dynamic Mechanical Analysis Q800 model, the glass transition temperature was measured in a temperature range from room temperature to 500° C. in a nitrogen atmosphere at a temperature increase rate of 5° C./min. The glass transition temperature was determined as a maximum peak of tan δ calculated according to the ratio of a storage modulus and a loss modulus.

(3) Transmittance: It was measured according to ASTM D 1003 standard.

(4) Thermal expansion coefficient It was measured according to ASTM E 831 standard.

(5) Tensile strength, tensile modulus, and elongation: It was measured according to ASTM D 882 standard.

TABLE 1

| Classification | Example | Comparative Example 3 |
|---|---|---|
| Viscosity of polyamic acid (cP) | 110,000~130,000 | 200,000 |
| Viscosity of first composition (cP) | 80,000~110,000 | 130,000~170,000 |
| Density (g/cm$^3$) | 1.4 | 1.45 |
| Surface properties | S | C |
| Tg (° C.) | 370~390 | 370 |
| Transmittance (%) | 30 | 25 |
| Thermal expansion coefficient (μm/(m · ° C.)) | 5.0 | 5.5 |
| Tensile strength (MPa) | 480 | 480 |
| Tensile modulus (GPa) | 6.5 | 6.5 |
| Elongation (%) | 90 | 75 |

Referring to the results of Tables 1 and 2, it could be seen that in the case of polyimide film of the embodiment according to the present disclosure, rapid film formation was possible, no surface detects occurred, and the tensile strength, tensile modulus and elongation were excellent, but in Comparative Examples 1 and 2, which exceeded the film forming temperature of the present disclosure, the bubbles of the polyimide film increased compared to the Example, and brittle occurred. In addition, it could be seen that in Comparative Example 3 in which a molar ratio of a first composition is out of the molar ratio condition of the amine-based catalyst and the acid anhydride-based dehydrating agent of the first composition of the present disclosure, a surface defect occurred on a surface of the polyimide film and mechanical properties such as elongation were reduced.

Simple modifications or changes of the present disclosure can be easily implemented by those of ordinary skill in the art, and all such modifications or changes should be construed as being included in the scope of the present disclosure.

The invention claimed is:

1. A method for manufacturing a polyimide film, comprising:
    preparing a polyamic acid by polymerizing a mixture containing an aromatic diamine and an aromatic acid dianhydride;
    preparing a first composition containing the polyamic acid, an amine-based catalyst, an acid anhydride-based dehydrating agent, and a solvent; and
    forming a polyimide film at 150° C. or less using the first composition,
    wherein the aromatic diamine includes 4,4'-oxydianiline and p-phenylenediamine,
    wherein the aromatic acid dianhydride includes pyromellitic dianhydride (PMDA) and 3,4,3',4'-biphenyltetracarboxylic dianhydride (BPDA),
    wherein the amine-based catalyst includes isoquinoline,
    wherein the first composition contains 100 parts by weight of polyamic acid, 5 to 25 parts by weight of an amine-based catalyst, 8 to 50 parts by weight of an acid anhydride-based dehydrating agent, and 30 to 200 parts by weight of a solvent,
    wherein the first composition contains the amine-based catalyst and the acid anhydride-based dehydrating agent in a molar ratio of 1:2 to 1:5.

2. The method of claim 1, wherein the mixture contains 100 parts by weight of an aromatic diamine and 70 to 350 parts by weight of an aromatic acid dianhydride.

3. The method of claim 1, wherein the aromatic diamine further includes one or more selected form the group consisting of diaminophenyl ether, o-phenylenediamine, m-phenylenediamine, 2,6-diaminopyridine, 4,4-diaminodiphenylsulfone, 4,4'-methylenediamine, 3,4'-oxydianiline, 2-(4-aminophenyl)-1H-benzoxazole-5-amine, 1,4-bis(4-aminophenoxy)benzene, 2-(4-aminophenyl)-5-aminobenzimidazole, 6-amino-2-(p-aminophenyl)benzoxazole, and 4,4'-diamino-p-terphenyl.

4. The method of claim 1, wherein the aromatic acid dianhydride further includes one or more selected from the group consisting of 3,3',4,4'-benzophenonetetracarboxylic dianhydride (BTDA), 3,4,3',4'-diphenylsulfonetetracarboxylic dianhydride, 1H,3H-naphtho[2,3-c:6,7-c']difuran-1,3,6,8-tetrone 2,3,6,7-naphthalenetetracarboxylic dianhydride, 1,4,5,8-naphthalenetetracarboxylic dianhydride, 4,4'-oxybis(2-benzofuran-1,3-dione), 4-[(1,3-dioxo-1,3-dihydro-2-benzofuran-5-yl)oxy]-2-benzofuran-1,3-dione, and 5,5'-sulfonylbis-1,3-isobenzofurandione.

5. The method of claim 1, further comprising, after the forming of the polyimide film, curing the formed polyimide film.

6. The method of claim 1, wherein the polyamic acid has a viscosity of 10,000 to 200,000 cP, as measured at 23° C.

7. The method of claim 1, wherein the first composition has a viscosity of 50,000 to 500,000 cP, as measured at 23° C.

8. The method of claim 1, wherein the acid anhydride-based dehydrating agent includes acetic anhydride.

9. The method of claim 1, wherein the solvent includes one or more selected from the group consisting of dimethylformamide, dimethylacetamide, N-methyl-2-pyrrolidone, m-cresol, tetrahydrofuran, and chloroform.

10. The method of claim 1, wherein the amine-based catalyst further includes one or more selected from the group consisting of betapicoline, triethylenediamine, and pyridine.

11. The method of claim 1, wherein the film formation is performed at 130 to 150° C.

* * * * *